(12) United States Patent
Munoz-Sanchez et al.

(10) Patent No.: US 12,477,394 B2
(45) Date of Patent: Nov. 18, 2025

(54) METHOD AND SYSTEM FOR PRIVATE NETWORK TRAFFIC OPTIMIZATION BASED ON REMOTE NETWORK CONTEXT

(71) Applicant: Verizon Patent and Licensing Inc., Basking Ridge, NJ (US)

(72) Inventors: Hugo David Munoz-Sanchez, Somerville, NJ (US); Abdessamad Krieche, Milford, MA (US); Kenneth Alusa, Flower Mound, TX (US); Francisco Varela, Union, NJ (US); Maria Cel Halili Zaballero, Ramsey, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 401 days.

(21) Appl. No.: 18/163,961

(22) Filed: Feb. 3, 2023

(65) Prior Publication Data

US 2024/0267782 A1 Aug. 8, 2024

(51) Int. Cl.
*H04W 28/084* (2023.01)
*H04W 12/08* (2021.01)

(52) U.S. Cl.
CPC ......... *H04W 28/084* (2023.05); *H04W 12/08* (2013.01)

(58) Field of Classification Search
CPC .......................... H04W 28/084; H04W 12/08
See application file for complete search history.

(56) References Cited

U.S. PATENT DOCUMENTS

| 2019/0191470 A1* | 6/2019 | Joseph | H04W 48/02 |
| 2023/0156476 A1* | 5/2023 | Newberg | H04W 12/73 726/4 |

\* cited by examiner

*Primary Examiner* — Wayne H Cai

(57) ABSTRACT

A method, a network device, and a non-transitory computer-readable storage medium are described in relation to a private network traffic optimization service. The service may be implemented in a private network. The service may include analyzing context information pertaining to a remote core network relative to a private network in which some users may not be authorized to use a core network of the private network. The service may detect when the remote core network may be unreachable based on the analysis. The service may include analyzing context information pertaining to the core network of the private network. The service may disable routing of traffic associated with the users and enable use of the core network based on a roaming configuration, a roaming core network, and an excess capacity of the core network.

20 Claims, 12 Drawing Sheets

US 12,477,394 B2

METHOD AND SYSTEM FOR PRIVATE NETWORK TRAFFIC OPTIMIZATION BASED ON REMOTE NETWORK CONTEXT

BACKGROUND

Network management presents various complexities due to the enumerable relevant factors to consider as well as their dynamic nature. In the case of private or enterprise networks, such networks may be scaled down to be deployable at the premises of enterprises, organizations, and governments for their industry specific data and communication needs. Typically, only authorized devices and users may use the network resources of such networks.

DETAILED DESCRIPTION

Figure 1:
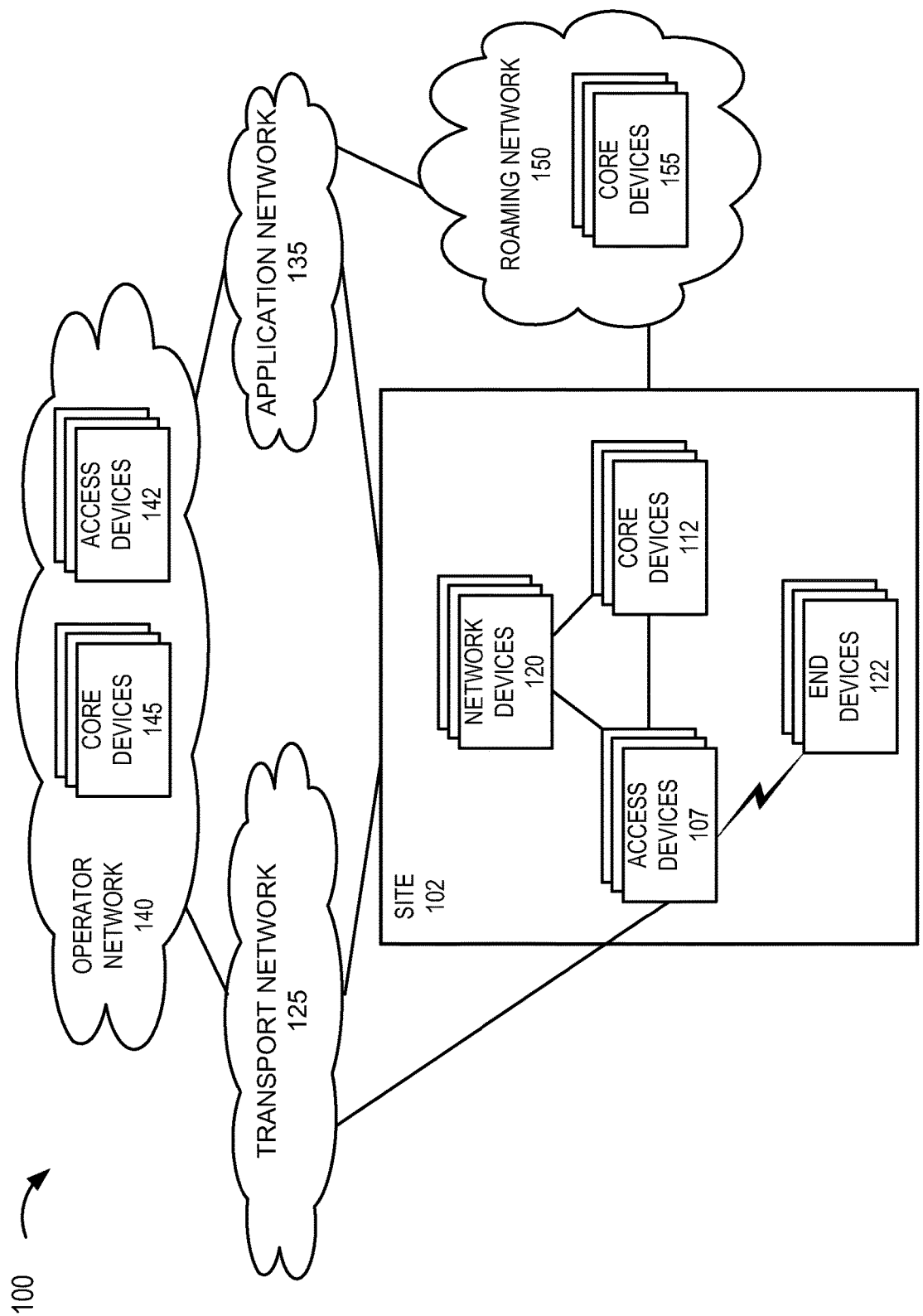
FIG. 1 is a diagram illustrating an exemplary environment in which an exemplary embodiment of a private network traffic optimization service may be implemented.

The following detailed description refers to the accompanying drawings. The same reference numbers in different drawings may identify the same or similar elements. Also, the following detailed description does not limit the invention.

In a private and/or enterprise (referred to simply as "private") network environment, various network devices, network elements, or network functions (referred to as network devices) are managed centrally within an operator's network. For example, the network devices may include radio access network (RAN) devices, core network devices, mobile edge computing (MEC) network devices, and/or other types of private network devices. The private network may connect to other networks including the operator's network and various application service layer networks, such as the Internet, the Web, a packet data network (PDN), a public network, or the like, for example.

According to various scenarios, different users may connect to the private network. For example, some users may be authorized to connect to the operator's core network but not a core network and any on-site application layer networks of the private network. Other users may be authorized to connect to only the private network and not the operator's core network, for example. Still other users may be authorized to connect to the operator's core network but not the core network of the private network yet have access to the on-site application service layer network and other types of assets and services of the private network. For example, such users may use a mobile private network (MPN) that may provide access to and use of the on-site application service layer network, the assets, and services of the private network via the operator's core network.

In view of this framework, when congestion or other network problems occur that may prevent use of the operator's core network, some of the users as explained above may be unable to acquire or use network services. For example, users that are not authorized to use the core network of the private network and perhaps the on-site application layer network, assets, and services of the private network, may be without any meaningful network access beyond connection to the RAN devices of the private network. For example, the user may be a visitor to the private network or subject to a handover from a RAN device of an operator network to a RAN device of the private network. In this regard, based on the user's loss of access to the operator's network, the user would not have any service.

According to exemplary embodiments, a private network traffic optimization service is described. According to an exemplary embodiment, the private network traffic optimization service may reroute traffic of users that may not be authorized to use private network resources, such as the core network of the private network or both the core network and an application service layer network, assets, and/or services of the private network, via the core network of the private network, as described herein. According to an exemplary embodiment, the private network traffic optimization service may reroute the traffic of the users based on a roaming configuration of the private network, as described herein. According to an exemplary embodiment, the roaming configuration may also include access and use of a roaming core network, as described herein.

According to an exemplary embodiment, the private network traffic optimization service may include a monitoring service. For example, the monitoring service may monitor connectivity, capacity, and/or metrics (also referred to as the "context" information) relating to the operator's core network. According to an exemplary embodiment, a private network device may include logic of the monitoring service, as described herein. For example, the private network may include a RAN device. According to an exemplary embodiment, the monitoring service may provide context information from the monitoring service to a network analytics service. The monitoring service is described further herein.

According to an exemplary embodiment, the private network traffic optimization service may include the network analytics service. For example, the network analytics service may include logic that analyzes and evaluates the context information. The network analytics service may determine, based on the analysis and evaluation, whether or not the current (and/or prospective) state indicated by the context information satisfies potential use of the rerouting services, as described herein. According to an exemplary embodiment, a private network device may include logic of a network resource analytics service, as described herein. For example, the private network device may include a traffic optimizer device of the private network. According to an exemplary embodiment, when the current and/or prospective state satisfies the potential use of the rerouting services, the network analytics service may trigger a network resource analytics service of the private network traffic optimization service. The network resource analytics service is described further herein.

According to an exemplary embodiment, the private network traffic optimization service may include the network resource analytics service. For example, the network resource analytics service may include logic that evaluates an available capacity of the core network of the private network. The network resource analytics service may determine the available capacity based on various criteria, as described herein. According to an exemplary embodiment, a private network device may include logic of the network resource analytics service, as described herein. For example, the private network device may include the traffic optimizer device of the private network. According to an exemplary embodiment, when the network resource analytics service determines that there is an excess capacity on the private network, a rerouting service of the private network traffic optimization service may be activated or enabled, as described herein. The network resource analytics service is described further herein.

According to an exemplary embodiment, the private network traffic optimization service may include the rerouting service. For example, the rerouting service may reroute traffic or route new traffic that would otherwise be routed to the operator's core network to the core network of the private network. The private core network may further route the traffic to a roaming core network, as described herein. According to an exemplary embodiment, a private network device may include logic of the rerouting service, as described herein. For example, the private network device may include the RAN device of the private network. According to an exemplary embodiment, the RAN device may enable a roaming configuration that allows users of relevance to access and use network resources of the private network, such as the core network of the private network. The rerouting service is described further herein.

According to an exemplary embodiment, the private network traffic optimization service may revert back to normal routing of users that may otherwise use the operator's core network, for example, based on the monitoring service and the network analytics service. For example, when the network analytics service determines that the context of the operator's core network can accommodate user traffic, the rerouting service may revert back to the routing of traffic to or via the operator's core network, as described herein.

In view of the foregoing, the private network traffic optimization service may optimize use of network resources between an operator's network and a private network. Additionally, the private network traffic optimization service may afford network services to users that may otherwise be without such network services absent the private network traffic optimization service, as described herein.

FIG. 1 is a diagram illustrating an exemplary environment 100 in which an exemplary embodiment of a private network traffic optimization service may be implemented. As illustrated, environment 100 includes a site 102. Site 102 may include access devices 107 (also referred to individually or generally as access device 107), core devices 112 (also referred to individually or generally as core device 112), network devices 120 (also referred to individually or generally as network device 120), and end devices 122 (also referred to individually or generally as end device 122). As further illustrated, environment 100 includes a transport network 125, an application network 135, an operator network 140, and a roaming network 150. Operator network 140 may include access devices 142 and core devices 145. Roaming network 150 may include core devices 155.

The number, type, and arrangement of networks illustrated in environment 100 are exemplary. For example, according to other exemplary embodiments, environment 100 may include fewer networks, additional networks, and/or different networks. The number, type, and arrangement of network devices illustrated in environment 100 are exemplary.

A network device may be implemented according to one or multiple network architectures, such as a client device, a server device, a peer device, a proxy device, a cloud device, edge, fog, and/or a virtualized network device. Additionally, a network device may be implemented according to various computing architectures, such as centralized, distributed, cloud, edge, and/or another type of computing architecture, and may be incorporated into various types of network architectures (e.g., Software Defined Networking (SDN), virtual, logical, network slice, etc.).

Environment 100 includes communication links between the networks, between the network devices, and between the end devices and the network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication. The private network traffic optimization service may use one or more of these planes of communication.

Site 102 may be implemented as a private or an enterprise location in which the private network traffic optimization service may be provided. For example, site 102 may host various network devices, as described herein, such as access device 107, core device 112, network device 120, and end device 122. As an example, site 102 may include a factory, a warehouse, a retail venue, a manufacturing plant, a hospital, or the like.

Site 102 may include an access network, such as a RAN. The RAN may include access device 107. According to various exemplary embodiments, access devices 107 may include a next generation Node B (gNB), an evolved Long Term Evolution evolved Node B (eLTE eNB), an eNB, a small cell node (e.g., a picocell device, a femtocell device, a microcell device, etc.), a remote radio head (RRH), a baseband unit (BBU), a radio unit (RU), a remote radio unit (RRU), a centralized unit (CU), a distributed unit (DU), a 5G ultra-wide band (UWB) node, a wireless relay device, an open network device (e.g., O-RAN Centralized Unit (O-CU), O-RAN Distributed Unit (O-DU), O-RAN next generation Node B (O-gNB), O-RAN evolved Node B (O-eNB)), and/or a future generation wireless access device (e.g., a 6G wireless station, a 7G wireless station, or another generation of wireless station).

Access devices 107 may include other types of wireless nodes (e.g., a Wi-Fi device, a WiMax device, a hotspot device, etc.) that provides a wireless access service, or another type of network device that provides a transport service (e.g., routing and forwarding), such as a router (e.g., a cell site router (CSR)), a switch, or another type of layer 3 (e.g., network layer of the Open Systems Interconnection (OSI) model) network device. Additionally, or alternatively, access devices 107 may include a wired and/or an optical device (e.g., modem, wired access point, optical access point, Ethernet device, multiplexer, etc.) that provides network access and/or transport service. According to some exemplary implementations, access device 107 may include a combined functionality of multiple radio access technologies (RATs) (e.g., 4G and 5G functionality, 5G and 5.5G functionality, etc.) via soft and hard bonding based on demands and needs. According to some exemplary implementations, access device 107 may include a split access device (e.g., a CU-control plane (CP), a CU-user plane (UP), etc.) or an integrated functionality, such as a CU-CP and a CU-UP, or other integrations of split RAN nodes. Access device 107 may be an indoor device or an outdoor device.

According to an exemplary embodiment, at least some of access devices 107 may be implemented as a virtual network device. Access device 107 may be virtualized according to various virtualization technologies, which may include a virtual machine (VM), a container, a pod, a host device, a hypervisor, an operating system, and/or another type of virtualization element, layer, or component. The virtualization technology may also be implemented based on other known (e.g., proprietary, hybrid, etc.) network function virtualization (NFV) or future generation virtualization.

According to an exemplary embodiment, at least some of access devices 107 may include logic of an exemplary embodiment of the private network traffic optimization service, as described herein. For example, at least some of access devices 107 may provide an exemplary embodiment of a monitoring service and an exemplary embodiment of a rerouting service.

Site 102 may include a core network. For example, core network may include core devices 112. For example, cores device 112 may include a user plane function (UPF), a Non-3GPP Interworking Function (N3IWF), an access and mobility management function (AMF), a session management function (SMF), a unified data management (UDM) device, a unified data repository (UDR), an authentication server function (AUSF), a network slice selection function (NSSF), a network repository function (NRF), a policy control function (PCF), a network data analytics function (NWDAF), a network exposure function (NEF), a service capability exposure function (SCEF), a lifecycle management (LCM) device, a mobility management entity (MME), a packet data network gateway (PGW), a home subscriber server (HSS), an enhanced packet data gateway (ePDG), a serving gateway (SGW), a home agent (HA), a home subscriber server (HSS), an authentication, authorization, and accounting (AAA) server, a policy and charging rules function (PCRF), a policy and charging enforcement function (PCEF), and/or a charging system (CS). Core devices 112 may be implemented to include network-in-a-box (NIB) devices.

Core device 112 may include a network device that provides a multi-RAT functionality (e.g., 4G and 5G, 5G and 5.5G, 5G and 6G, etc.), such as an SMF with PGW control plane functionality (e.g., SMF+PGW-C), a UPF with PGW user plane functionality (e.g., UPF+PGW-U), and/or other combined nodes (e.g., an HSS with a UDM and/or UDR, an MME with an AMF, etc.). Also, core device 112 may include a split core device, such as a session management (SM) PCF, an access management (AM) PCF, a user equipment (UE) PCF, and/or another type of split architecture associated with another core device 112, as described herein. According to an exemplary embodiment, at least some of core devices 112 may be a virtual network device. According to an exemplary embodiment, core devices 112 includes a Diameter Proxy device.

Network devices 120 may include network devices of a MEC network and/or platform. The MEC network may be implemented using one or multiple technologies including, for example, NFV, containers, SDN, cloud computing, Infrastructure-as-a-Service (IaaS), Platform-as-a-Service (PaaS), Software-as-a-Service (SaaS), or another type of network technology. Network devices 120 may include virtual network devices (e.g., virtualized network functions (VNFs), servers, hosts, containers, pods, hypervisors, VMs, network function virtualization infrastructure (NFVI), and/or other types of virtualization elements, layers, hardware resources, operating systems, engines, etc.) and associated applications services for use by end devices 122.

Network devices 120 may include a security device. For example, the security device may include a firewall and/or other types of security devices (e.g., authentication device, authorization device, etc.). Network devices 120 may include other types of network devices, such as a switch (e.g., top of rack (ToR) switch, end of rack (EoR) switch), a router, and/or a load balancer. According to an exemplary embodiment, at least some of network devices 120 may include a virtual network device.

According to an exemplary embodiment, site 102 may include a network device (also referred to as a traffic optimizer device) that provides the network analytics service and the network resource analytics service of the private network traffic optimization service. According to various exemplary embodiments, the traffic optimizer device may be implemented as access device 107, core device 112, or network device 120, for example. The private network traffic optimization service, which includes the various sub-services (e.g., monitoring service, network analytics service, etc.) are described in relation to a network device (e.g., access device 107, etc.). However, according to other exemplary embodiments, a sub-service or a step, function, or process of the sub-service may be implemented, in whole or in part by a different network device than described. Additionally, or alternatively, for example, the private network traffic optimization service may be provided, in whole or in part, by a standalone network device that may not be a part of an access network, a core network, and/or an application service layer network.

End device 122 includes a device that may have communication capabilities (e.g., wireless, wired, optical, etc.). End device 122 may or may not have computational capabilities. End device 122 may be implemented as a mobile device, a portable device, a stationary device (e.g., a non-mobile device and/or a non-portable device), a device operated by a user, or a device not operated by a user. For example, end device 122 may be implemented as a smartphone, a mobile phone, a personal digital assistant, a tablet, a netbook, a wearable device (e.g., a watch, glasses, etc.), a computer, an IoT device, a drone, a robot, a smart device, a camera, a fixed wireless device, a sensor, or other another type of user equipment (UE). End device 122 may be configured to execute various types of software (e.g., applications, programs, etc.). The number and the types of software may vary among end devices 122. End device 122 may include "edge-aware" and/or "edge-unaware" application service clients. For purposes of description, end device 122 is not considered a network device.

According to various exemplary embodiments, end device 122 may be operated by or associated with different types of users (not illustrated). For example, some users (also referred to generally as a "user A" type) may be authorized to connect to operator's network 140 (e.g., core devices 145) but not the core network (e.g., core devices 112) and an on-site application layer network device (e.g., network device 120) of the private network (e.g., site 102). Other users (e.g., also referred to as "user B" type may be authorized to connect to the operator's network 140 but not the core network of the private network (e.g., core devices 112) yet have access to the on-site application service layer network devices and other types of assets and services of the private network (e.g., network devices 120). For example, such users may use an MPN via operator network 140 to connect to network devices 120. Still other users (e.g., also referred to as "user C" type) may be authorized to connect to the private network (e.g., site 102) and not operator's network 140, for example. According to an exemplary embodiment, the private network traffic optimization service may pertain to user A and user B types. For example, such types of users may have at least no authorization to access and use core devices 112 of site 102, and potentially no authorization (e.g., user A type) to access and use application services associated with network devices 120 (e.g., MEC servers, enterprise applications, etc.). While user A and B types have been described, other types of users with limited authorization to access and use network devices of a private network, such as site 102, may be implemented.

Transport network 125 may include an X-haul network (e.g., backhaul, fronthaul, etc.) and/or another suitable transport and/or intermediary network. Transport network 125 may support communication between site 102 and operator network 140.

Application network 135 may include a public network, the Internet, a PDN, a service provider network, the World Wide Web (WWW), an Internet Protocol Multimedia Subsystem (IMS) network, a public cloud network, a Rich Communication Service (RCS) network, a software-defined (SD) network, a virtual network, a data center, a data network, or other type of network that may provide access to and/or may host an end device application, service, or asset (also referred to as an "application service").

Operator network 140 may include one or multiple types of networks and/or technologies. For example, operator network 140 may include a public network, a private network, a RAN, a core network, and an application network similar to those previously described. Further purposes of illustration, FIG. 1 depicts that operator network 140 may include access devices 142 and core devices 145. According to an exemplary embodiment, operator network 140 may not provide the private traffic optimization service. Access devices 142 may include similar network devices as those described in relation to access devices 107. Similarly, core devices 145 may include similar network devices as those described in relation to core devices 112.

Roaming network 150 may include one or multiple type of networks and/or technologies. For example, roaming network 150 may include a public network, a private network, a RAN, a core network, and an application network similar to those previously described. Further purposes of illustration, FIG. 1 depicts that roaming network 150 may include core devices 155. According to an exemplary embodiment, roaming network 150 may support the private traffic optimization service. Core devices 155 may include similar network devices as those described in relation to core devices 112. According to an exemplary embodiment, although not illustrated, the communication link between site 102 and roaming network 150 may include an intermediary network. For example, the intermediary network may include an Internetworking Packet Exchange (IPX) network and/or another suitable transport or data network.

Figure 2A:
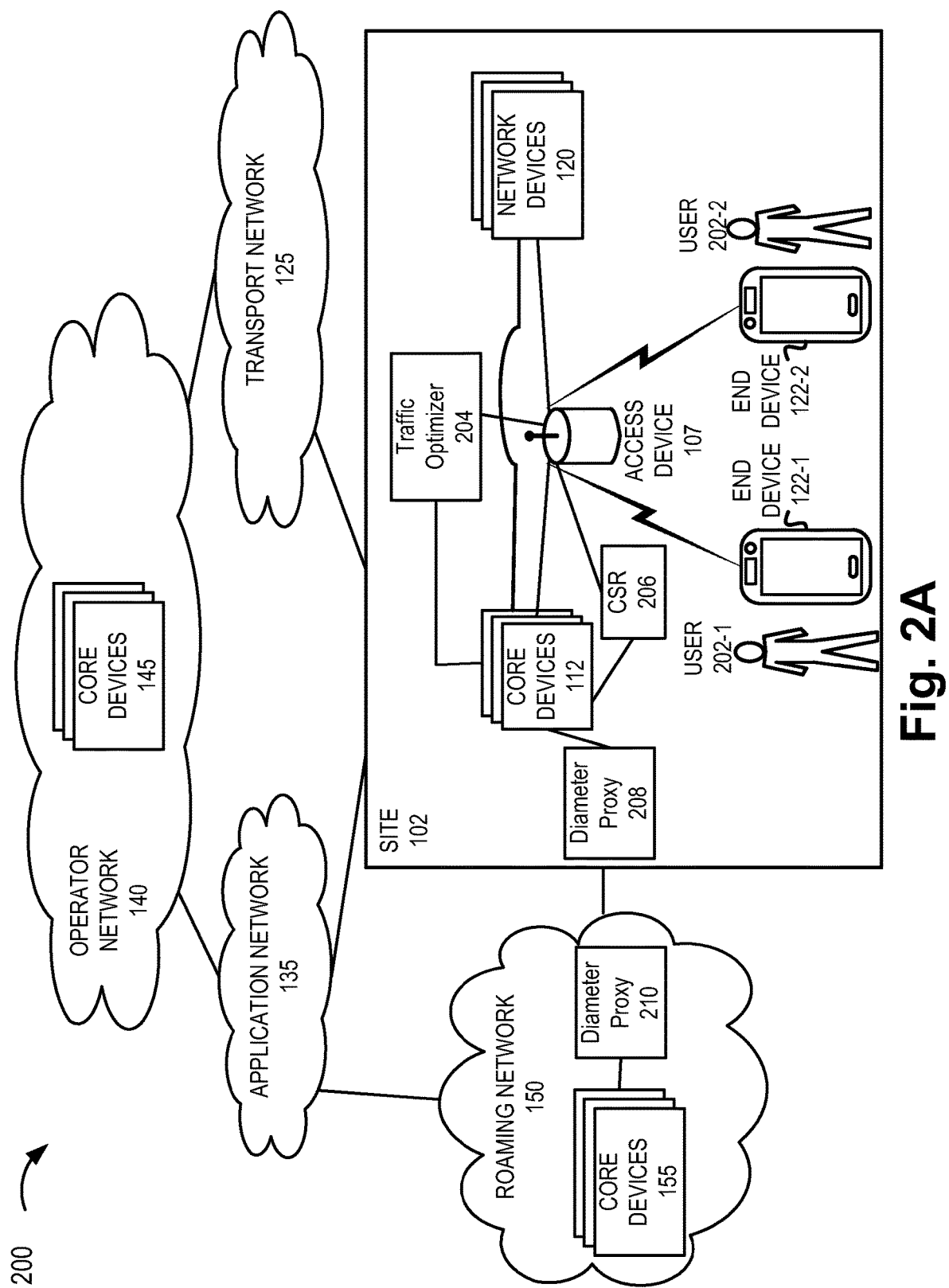
FIG. 2A is a diagram illustrating another exemplary environment in which an exemplary embodiment of the private network traffic optimization service may be implemented.

FIG. 2A is a diagram illustrating another exemplary environment 200 in which an exemplary embodiment of the private network traffic optimization service may be implemented. Referring to FIG. 2A, site 102 includes devices previously described and illustrated in FIG. 1. FIG. 2A end device 122-1 and 122-2, as well as users 202-1 and 202-2 (also referred to as users 202, or generally or individually as user 202). Users 202 may include a user A type and a user B type, for example. FIG. 2A further illustrates a traffic optimizer 204, a CSR 206, a Diameter Proxy 208, and a Diameter Proxy 210.

Traffic optimizer 204 may include logic of the private network traffic optimization service. For example, according to an exemplary embodiment, traffic optimizer 204 may provide the network analytics service and the network resource analytics service, as described herein.

CSR 206 may provide routing services for one or multiple cell sites (e.g., access device 107, such as an eNB, gNB, BBU, etc.) at site 102 and enables connectivity to other network devices within site 102 (e.g., traffic optimizer 204, other core devices 112, such as an MME, an SMF, etc.) as well as connectivity (directly or indirectly) to external networks, such as roaming network 150, transport network 125, operator network 140, and so forth. CSR 206 may further provide aggregation and/or gateway services.

Diameter proxy 208 and Diameter proxy 210 may each provide authentication, authorization, and accounting services. According to an exemplary embodiment of the private network traffic optimization service, Diameter proxies 208 and 210 may support a roaming procedure when the rerouting service is invoked or enabled, as described herein. Similar to that described in relation to environment 100, the number, type, and arrangement of network devices, communication links, and end devices are exemplary.

Figure 2B:
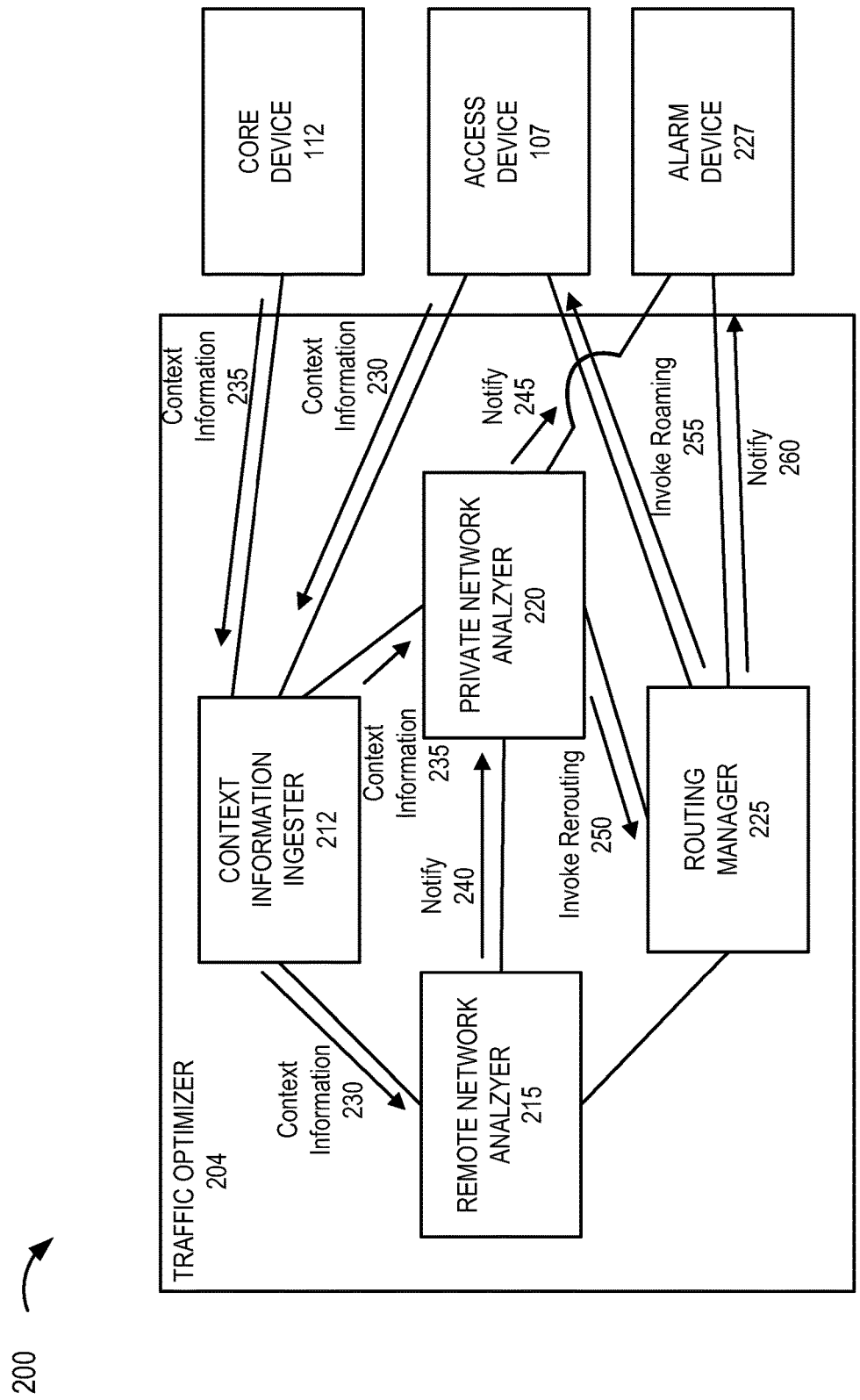
FIG. 2B is a diagram illustrating exemplary components of a traffic optimizer and other network devices included in the environment depicted in FIG. 2A and an exemplary process of the private network traffic optimization service.

FIG. 2B is a diagram of exemplary components of traffic optimizer 204 and exemplary connections with other exemplary network devices of site 102, such as access device 107 and an alarm device 227 (e.g., network device 120). Referring to FIG. 2B, traffic optimizer 204 may include a context information ingester 212, a remote network analyzer 215, a private network analyzer 220, and a routing manager 225.

Context information ingester 212 may include logic that ingests various types of context information relating to environment 100 and/or environment 200. According to an exemplary embodiment, access device 107 and/or the private access network of site 102 may provide context information 230 to traffic optimizer 204, as illustrated. According to some exemplary embodiments, at least some of context information 230 and/or context information 235 may be provided from other types of network devices, such as an NWDAF and/or a network performance management system.

According to an exemplary embodiment, context information 230 may relate to access devices 107 of site 102, users 202, a communication link (e.g., direct, indirect (e.g., intermediary) communication link) between site 102 and operator network 140, operator network 140, intermediary networks (e.g., transport network 125 including network devices and communication links), and/or communication links between access devices 107. For example, context information 230 may indicate a state (e.g., up, down, fluctuating between up and down, congested, not congested, available bandwidth, etc.) pertaining to the connectivity associated with a communication link between access device 107 and operator network 140. Context information 230 may indicate a reachability to one or more core devices 145 (e.g., a security gateway (SeGW), an MME, an SGW, an SMF, a PGW, a UPF, etc.) of operator network 140. As an example, core device 145 may be subject to a failure, an outage, a congested state, or operating normally relative to site 102 (e.g., access device 107, etc.). Context information 230 may further include the number of user A and user B types using access device 107/private RAN, the number of session rejections for user A and user B types, and the number and type of bearers and/or quality of service (QoS) flows within a requested session and/or a requested packet data unit (PDU) session. For example, the number and type of request sessions or QoS flows may be categorized according to various nomenclatures, such as administrative, Internet, operator application, MDN, and/or another type of genre. Context information 230 may include the number of RRC connections that relate to user A and user B types at one or multiple access devices 107. Context information 230 may include other types of metrics, parameters and values, or performance-related information (also referred to simply as performance information) pertaining to access device 107, a group of access devices 107, and/or the private access device (e.g., RAN) of site 102. For example, the performance information may include quality of service (QoS), key performance indicators (KPIs), service level agreement (SLA), quality of experience (QoE), mean opinion score (MOS), and/or another type of performance metric parameter and value.

Context information 230 may further indicate the number of user C types, the number of sessions, bearers, QoS flows, types of sessions/QoS flows, the number of RRC connections, and performance information relating to the user C types, in relation to one or multiple access devices 107, the private RAN, network devices 120, and/or application network 135.

According to an exemplary embodiment, core device 112 and/or the private core network of site 102 may provide context information 235 to traffic optimizer 204, as illustrated. For example, context information 235 may relate to core devices 112 of site 102, users 202, a communication link (e.g., direct, indirect (e.g., intermediary) communication link) between site 102 and operator network 140, operator network 140, intermediary networks (e.g., transport network 125 including network devices and communication links), and/or communication links between access devices 107. For example, context information 235 may indicate a state (e.g., up, down, fluctuating between up and down, congested, not congested, available bandwidth, etc.) pertaining to the connectivity associated with a communication link between core devices 112, core device 112 and access device 107, and other communication links, as described herein. Context information 230 may indicate a reachability of one or more core devices 112 to other networks and network devices external from operator network 140. Context information 235 may further include the number of user A and user B types using core device 112/private core network, the number of session rejections for user A and user B types, and the number and type of bearers and/or quality of service (QoS) flows within a requested session and/or a requested PDU session. The number and type of request sessions or QoS flows may be categorized, as described herein. Context information 235 may include performance information which may relate to one or core devices, the private core network, and/or application service sessions with network devices 120 and application network 135, for example.

Context information 235 may further indicate the number of user C types, the number of sessions, bearers, QoS flows, types of sessions/QoS flows, and performance information relating to the user C types, in relation to one or multiple core devices 112, the private core network, network devices 120, and/or application network 135.

Context information 235 may include other types of information relating to network resource utilization and available network resources. For example, context information 235 may include parameters and values pertaining to memory utilization, central processing unit (CPU) utilization, storage utilization, network utilization, communication interface utilization, communication link utilization and available network resources relating to core device 112 (e.g., an MME, an SMF, etc.), the private core network, network devices 120, and the private application service layer network (e.g., a MEC network, assets, services at site 102, etc.).

According to an exemplary embodiment, context information ingester 212 may disaggregate the context information and provide such context information to remote network analyzer 215 and private network analyzer 220.

Remote network analyzer 215 may include logic that determines the connectivity, reachability, and/or state of one or more core devices 145 of operator network 140. For example, remote network analyzer 215 may analyze and evaluate context information 230. Based on the analysis and evaluation, remote network analyzer 215 may determine whether there are connectivity issues, failures, outages, and/or other types of network issues that may prevent successful execution of various network procedures, such as registration, attachment, authentication, authorization, user plane session establishment, maintenance, and teardown (e.g., relating to PDU sessions, network slices, QoS flows, bearers, etc.) in relation to user A and B types. Remote network analyzer 215 may perform similar analysis and evaluations relating to user C types.

Remote network analyzer 215 may compare or evaluate context information 230 based on threshold parameters and threshold parameter values, network policies, and/or rules. When there is a detected network issue, remote network analyzer 215 may notify 240 private network analyzer 220. For example, the notification may include context information 230 pertaining to access device 107 of relevance. When there is not a detected network issue, remote network analyzer 215 may not notify private network analyzer 220, and may continue to receive context information 230 for analysis and evaluation.

Private network analyzer 220 may include logic that determines the state of one or more core devices 112, the private core network, and communication link within and connected to the private core network. For example, private network analyzer 220 may analyze and evaluate context information 235. Based on the analysis and evaluation, private network analyzer 220 may determine whether there are connectivity issues, failures, outages, and/or other types of network issues that may prevent successful execution of various network procedures, such as registration, attachment, authentication, authorization, user plane session establishment, maintenance, and teardown (e.g., relating to PDU sessions, network slices, QoS flows, bearers, etc.) in relation to various end devices 122 and users.

Private network analyzer 220 may compare or evaluate context information 235 based on threshold parameters and threshold parameter values, network policies, and/or rules. When there is a detected network issue, private network analyzer 220 may notify 245 alarm device 227. For example, the notification may include context information 235 pertaining to core device 112 and/or another network element of relevance. When there is not a detected network issue, private network analyzer 220 may continue to receive context information 235 for analysis and evaluation.

Private network analyzer 220 may further evaluate other types of context information 235, such as network resource utilization and available network resource levels. Similar to that described above and herein, private network analyzer 220 may compare utilization and available network resource values to threshold parameters and values, network policies, and/or rules. When there is a detected network issue, private network analyzer 220 may notify 245 alarm device 227.

According to an exemplary embodiment, when private network analyzer 220 receives a notification from remote network analyzer 215, private network analyzer 220 may analyze and evaluate available or excess capacities of site 102 including the private core network, one or more core devices 112, communication links, and so forth. Based on the result of the analysis and evaluation, private network analyzer 220 may determine whether user A and/or B types may be served by the private core network or one or multiple core devices 112, for example. According to various exemplary scenarios, private network analyzer 220 may determine that there is sufficient capacity or available network resources to serve some or all of user A and user B types that may be subject to the network issues identified by remote network analyzer and in addition to user C types, or private network analyzer 220 may determine that there is not sufficient capacity or available network resources to serve any or some of user A and user B types in light of existing loads associated with user C types. According to this exemplary scenario, assume that private network analyzer 220 determines that there is sufficient capacity or available network resources to serve user A and user B types that may be subject to the network issue pertaining to operator network 140. In response to such a determination, private network analyzer 220 may invoke a rerouting procedure 250 based on communication with routing manager 225.

Routing manager 225 may include logic that manages the enablement and disablement of the rerouting service. For example, in response to receiving the invocation of the rerouting procedure from private network analyzer 220, routing manager 225 may generate and transmit a message that disables a remote core network configuration at access device 107. That is, the routing of traffic associated with user A and user B types via operator network 140 is terminated. Routing manager 225 may select one or multiple access devices 107 to which to transmit the message. Although not illustrated, routing manager 225 may select access device 107 based on context information 230 and/or 235 of relevance, which may be received from remote network analyzer 215 and/or private network analyzer 220, to the rerouting service. For example, context information 230 that may indicate which access device 107 has connectivity issues with operator network 140 may be selected to provide the rerouting service. As illustrated, the message from routing manager 225 to access device 107 may invoke a roaming 255 configuration for user A and user B types. Routing manager 225 may also notify 260 alarm device 227. For example, alarm device 227 may provide fault management services, as described herein, in relation to access device 107 that may be having reachability/connectivity issues with operator network 140. Additionally, or alternatively, routing manager 225 may notify 260 alarm device 227 when there is a failure to invoke the rerouting service and roaming configuration. The rerouting service and roaming configuration is described further below.

As previously described, site 102 may include alarm device 227. Alarm device 227 may include a network device that receives an alarm or a notification when configurable events may occur. For example, the alarm or notification may relate to when a user (e.g., user A type, user B type) is unable to establish a session with operator network 140, when the rerouting service may be invoked, when faults, outages, connectivity issues may occur within site 102, and so forth. Alarm device 227 may generate tickets relating to a network issue, invoke a remedial procedure, and/or perform other types of fault management services.

Figure 3A:
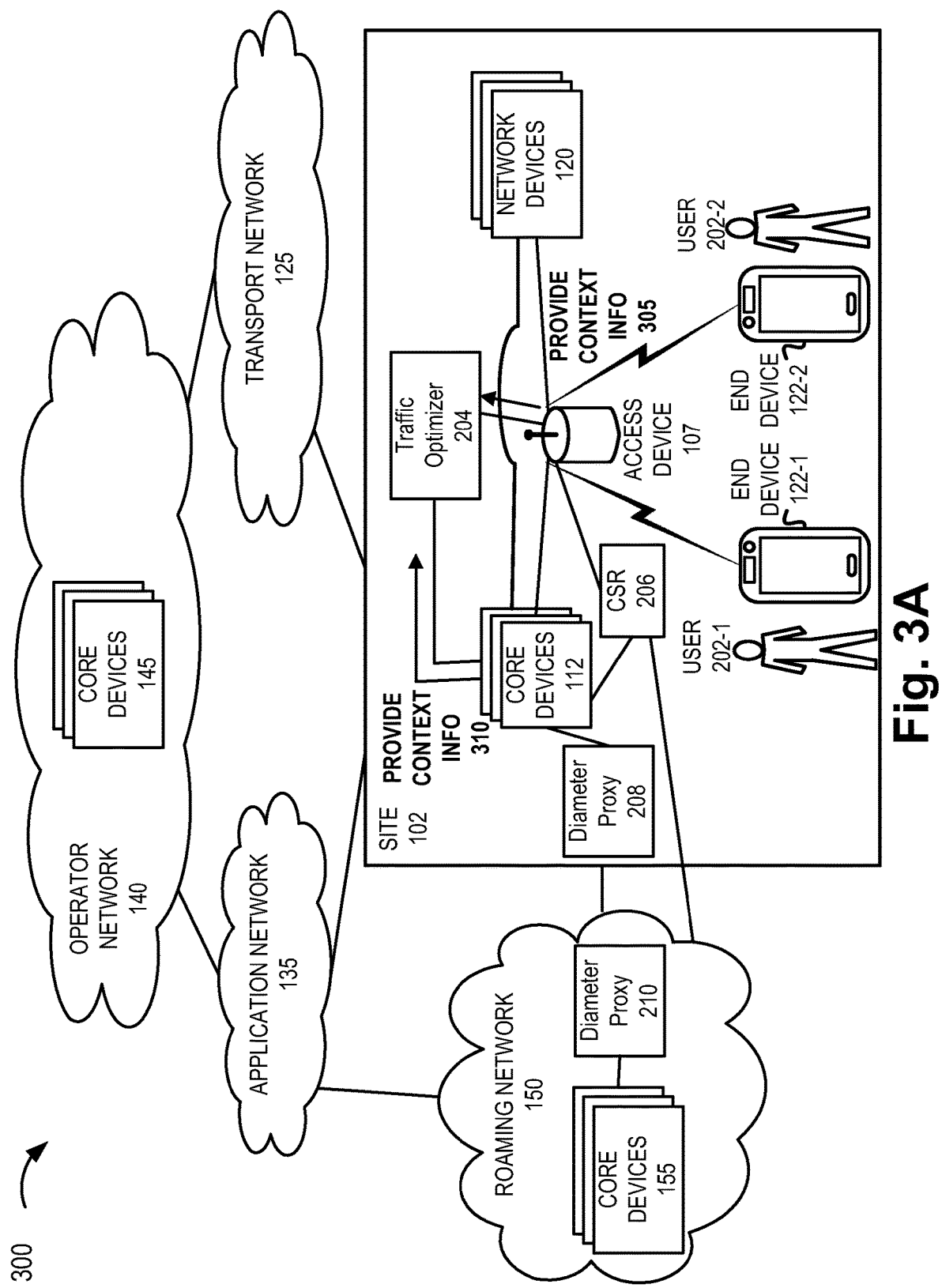
FIGS. 3A-3F are diagrams illustrating an exemplary process of an exemplary embodiment of the private network traffic optimization service.
Figure 3B:
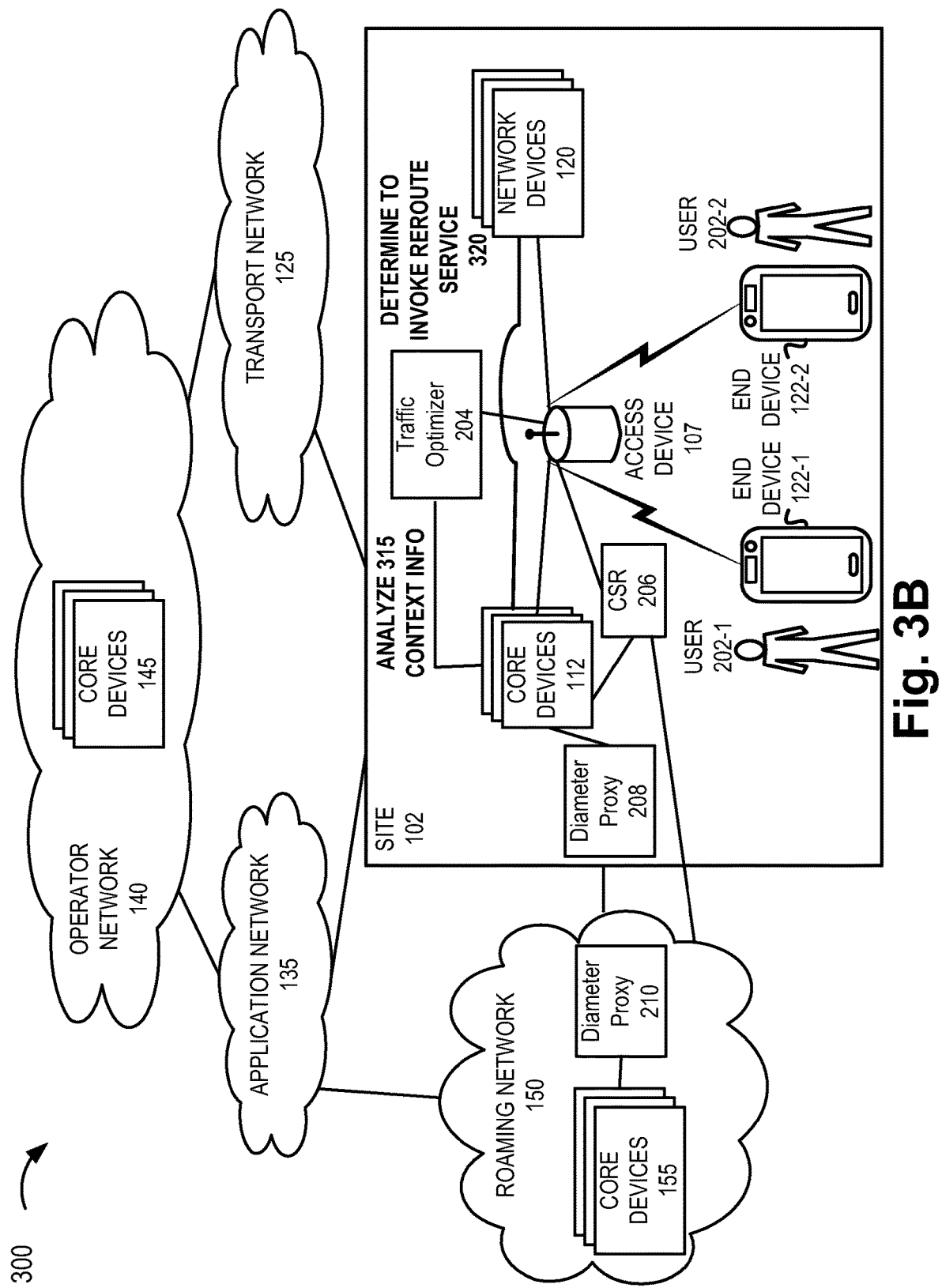
Figure 3C:
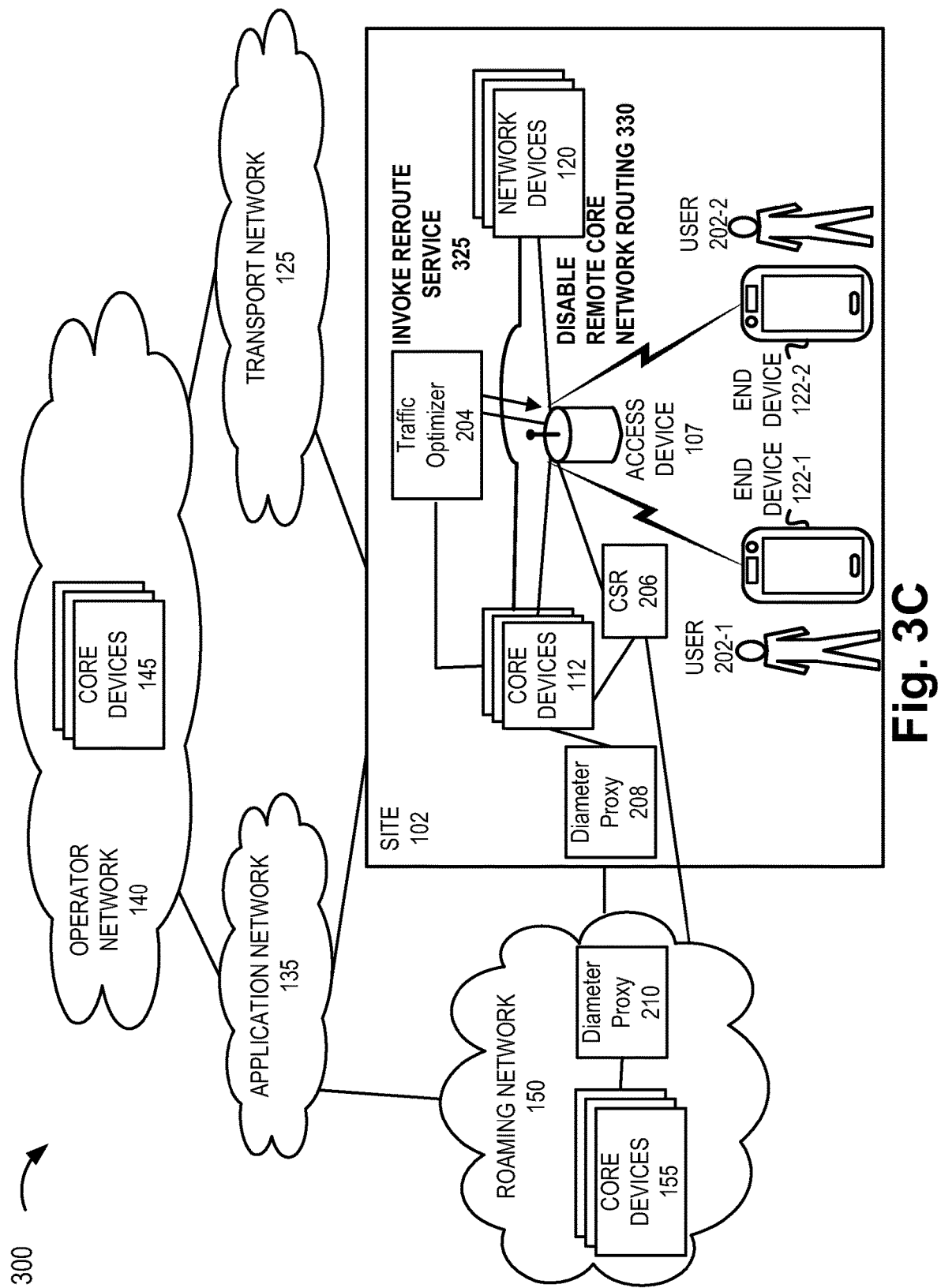

FIGS. 3A-3F are diagrams illustrating an exemplary process 300 of an exemplary embodiment of the private network traffic optimization service. Referring to FIG. 3A, access device 107 may provide context information 305 and core devices 112 may provide context information 310 to traffic optimizer 204. Referring to FIG. 3B, traffic optimizer 204 may analyze 315 the context information. According to this exemplary scenario, traffic optimizer 204 may determine to invoke the reroute service 320. For example, the context information from access device 107 may indicate connectivity issues with operator network 140, and the context information from core devices 112 may indicate available capacity to accommodate traffic from users A and B types, as described herein. Referring to FIG. 3C, traffic optimizer 204 may invoke the reroute service 325. For example, traffic optimizer 204 may select access device 107, and generate and transmit a message to access device 107. In response, access device 107 may disable remote core network routing 330, which may apply to user A and user B types, such as user 202-1/end device 122-1 and user 202-2/end device 122-2. However, access device 107 may continue to broadcast master information block (MIB) and system information block (SIB) messages pertaining to users 202/end device 122-1 and 122-2, which may include the public land mobile network identifiers (PLMN-ID) of operator network 140 and potentially other networks reachable via operator network 140 (e.g., in a SIB 1). The disablement of the remote core network routing may enable the access and use of the private core network for user A and user B types according to the roaming configuration, as described herein.

Figure 3D:
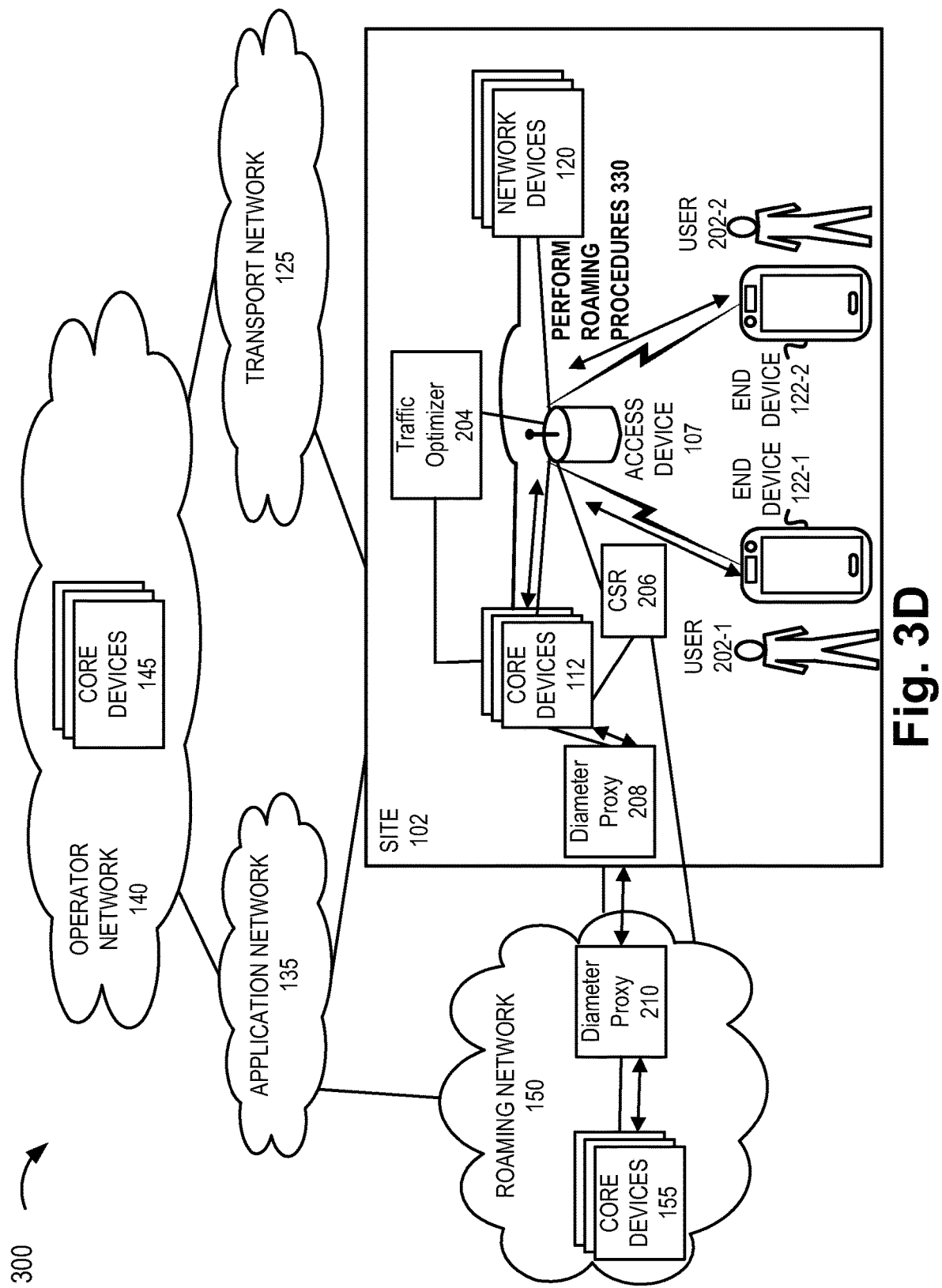

Referring to FIG. 3D, assume that both users 202-1 and 202-2 wish to register and attach to a core network. As illustrated, the private network of site 102 may treat users 202/end devices 122 as roaming users. As such, access device 107 may route messages to core devices 112 so that end devices 122 may register and attach to the private core network. According to various exemplary embodiments, registration and attachment procedures, which may include other sub-procedures, such as authentication, bearer setup, initial context setup, PDU session establishment, PDN connectivity, etc., may be performed according to or specified by a standards body, such as Third Generation Partnership Project (3GPP), 3GPP2, International Telecommunication Union (ITU), European Telecommunications Standards Institute (ETSI), GSM Association (GSMA), and the like. Additionally, or alternatively, a registration and/or an attachment procedure may be provided according to a non-standard or proprietary manner (e.g., relative to 3GPP and the like). Core devices 112 of the private core network may be pre-configured with roaming capabilities such that the disablement of remote core network routing may not require any modification or further action relative to core devices 112 of the private core network. Additionally, the disablement of the remote core network routing may enable routing to the private core network and associated remote core network 150, as described herein.

As a part of the registration and attachment procedures, core devices 112 may communicate with core devices 155 of roaming network 150. For example, an MME or an SMF of the private network may request authentication information from an HSS or a UDM/UDR of roaming network 150 via diameter proxies 208 and 210. The MME or the SMF of the private network (e.g., core device 112) may authenticate/authorize users 202-1 and 202-2 and may obtain subscription information. The MME or the SMF of the private network may manage mobility and/or session management. Additionally, as a part of the attachment procedure, users 202-1 and 202-2 may be attached to an SGW/PGW or a UPF in the private core network and an SGW/PGW or a UPF in roaming network 150. As an example, user plane traffic may traverse core device 112 (e.g., a UPF) and core device 155 (e.g., a UPF) via an IPX network. According to some exemplary implementations, the user plane traffic may be routed via CSR 206.

Figure 3E:
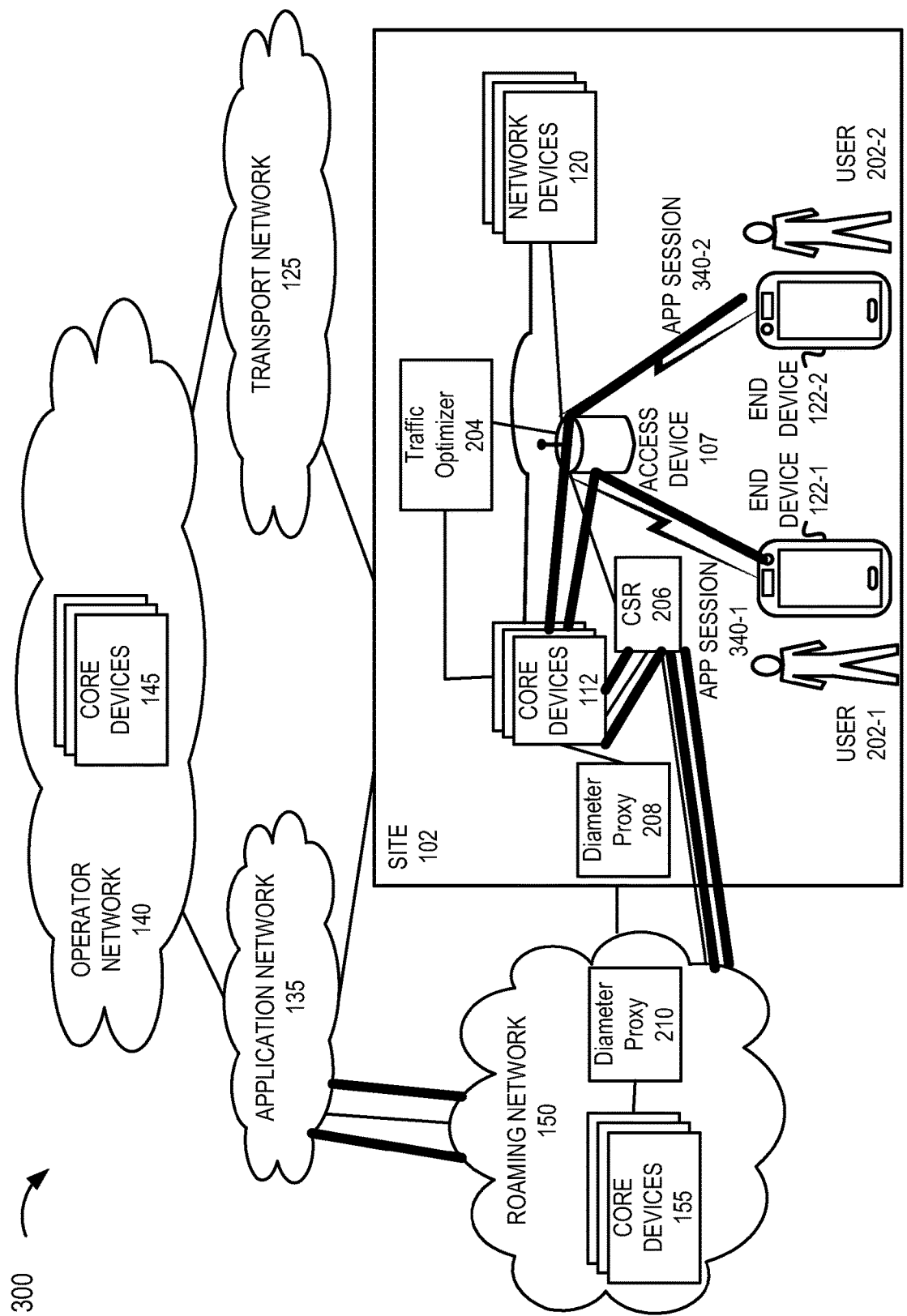

Referring to FIG. 3E, based on successful attachment, user 202-1/end device 122-1 and user 202-2 and end device 122-2 may establish an application session 340-1 and an application session 340-2, respectively, with application network 135 via access device 107 of the private RAN, core devices 112 of the private core network, and roaming network 150.

Figure 3F:
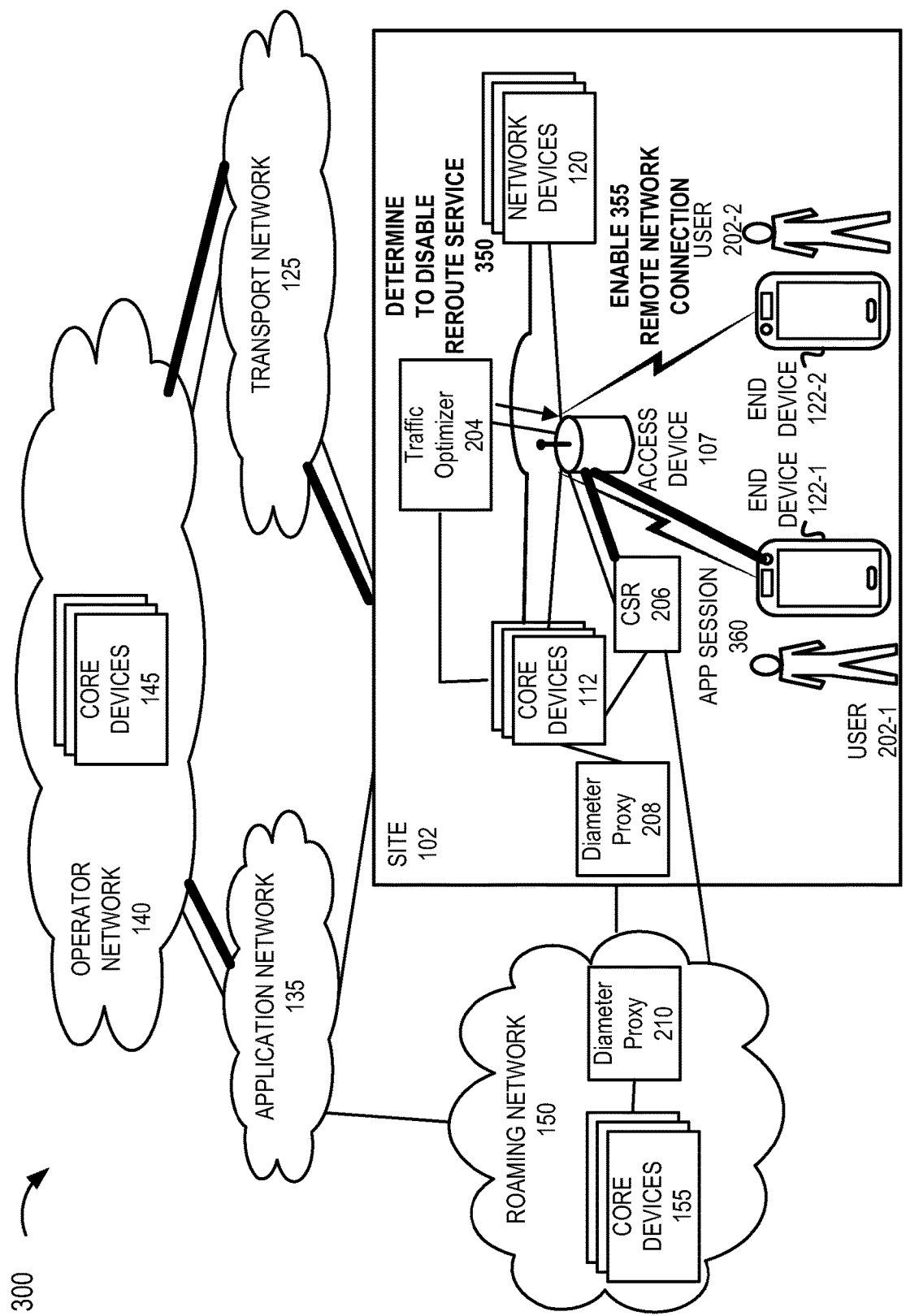

Referring to FIG. 3F, as a part of process 300, the enablement of remote core network routing may include traffic optimizer 204 determining to disable the reroute service 350 based on at least the analysis and evaluation of context information 305, and potentially context information 310. In response to this determination, traffic optimizer 204 (e.g., routing manager 225) may generate and transmit a message to access device 107 of relevance to enable 355 the remote network connection. As a result, according to an exemplary scenario, an application session 360 of user 202-1/end device 122-1 may include the access and use of core devices 145 of operator network 140, in which user plane traffic may be routed via access device 107, CSR 206, transport network 125, and operator network 140, to and from application network 135, for example.

Figure 4:
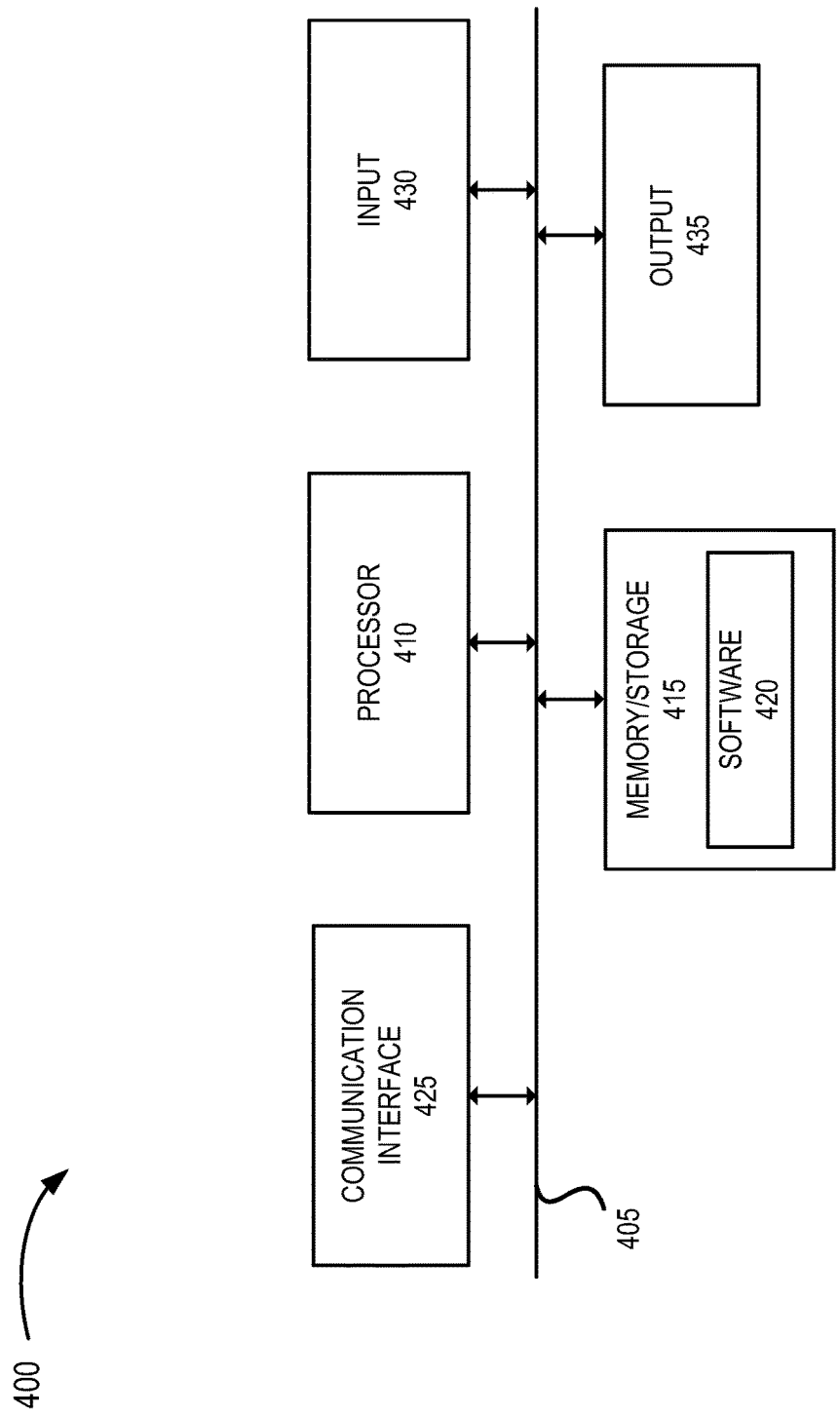
FIG. 4 is a diagram illustrating exemplary components of a device that may correspond to one or more of the devices illustrated and described herein.

FIG. 4 is a diagram illustrating exemplary components of a device 400 that may be included in one or more of the devices described herein. For example, device 400 may correspond to access device 107, core device 112, network device 120, end device 122, access device 142, core device 145, core device 155, traffic optimizer 204, CSR 206, diameter proxy 208, diameter proxy 210, and/or other types of devices, as described herein. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation, or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, learning, model-based, etc.

Memory/storage 415 includes one or multiple memories and/or one or multiple other types of storage mediums. For example, memory/storage 415 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 415 may be external to and/or removable from device 400, such as, for example, a Universal Serial Bus (USB) memory stick, a dongle, a hard disk, mass storage, off-line storage, or some other type of storing medium. Memory/storage 415 may store data, software, and/or instructions related to the operation of device 400.

Software 420 includes an application or a program that provides a function and/or a process. As an example, with reference to access device 107 and core device 112, software 420 may include an application that, when executed by processor 410, provides a function and/or a process of private network traffic optimization service, as described herein. Additionally, for example, with reference to traffic optimizer 204, software 420 may include an application that, when executed by processor 410, provides a function and/or a process of private network traffic optimization service, as described herein. Software 420 may also include firmware, middleware, microcode, hardware description language (HDL), and/or another form of instruction. Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces, optical interfaces, and/or wired interfaces. For example, communication interface 425 may include one or multiple transmitters and receivers, or transceivers. Communication interface 425 may operate according to a protocol stack and a communication standard.

Input 430 permits an input into device 400. For example, input 430 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures and according to various network architectures (e.g., a virtualized function, etc.). Device 400 may be implemented in the same manner. For example, device 400 may be instantiated, created, deleted, or placed in some other operational state during its life cycle (e.g., refreshed, paused, suspended, rebooting, or another type of state or status), using well-known virtualization technologies. For example, access device 107, core device 112, network device 120, and/or another type of network device or end device 122, as described herein, may be a virtualized device.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a function or a process described herein. Alternatively, for example, according to other implementations, device 400 performs a function or a process described herein based on the execution of hardware (processor 410, etc.).

Figure 5:
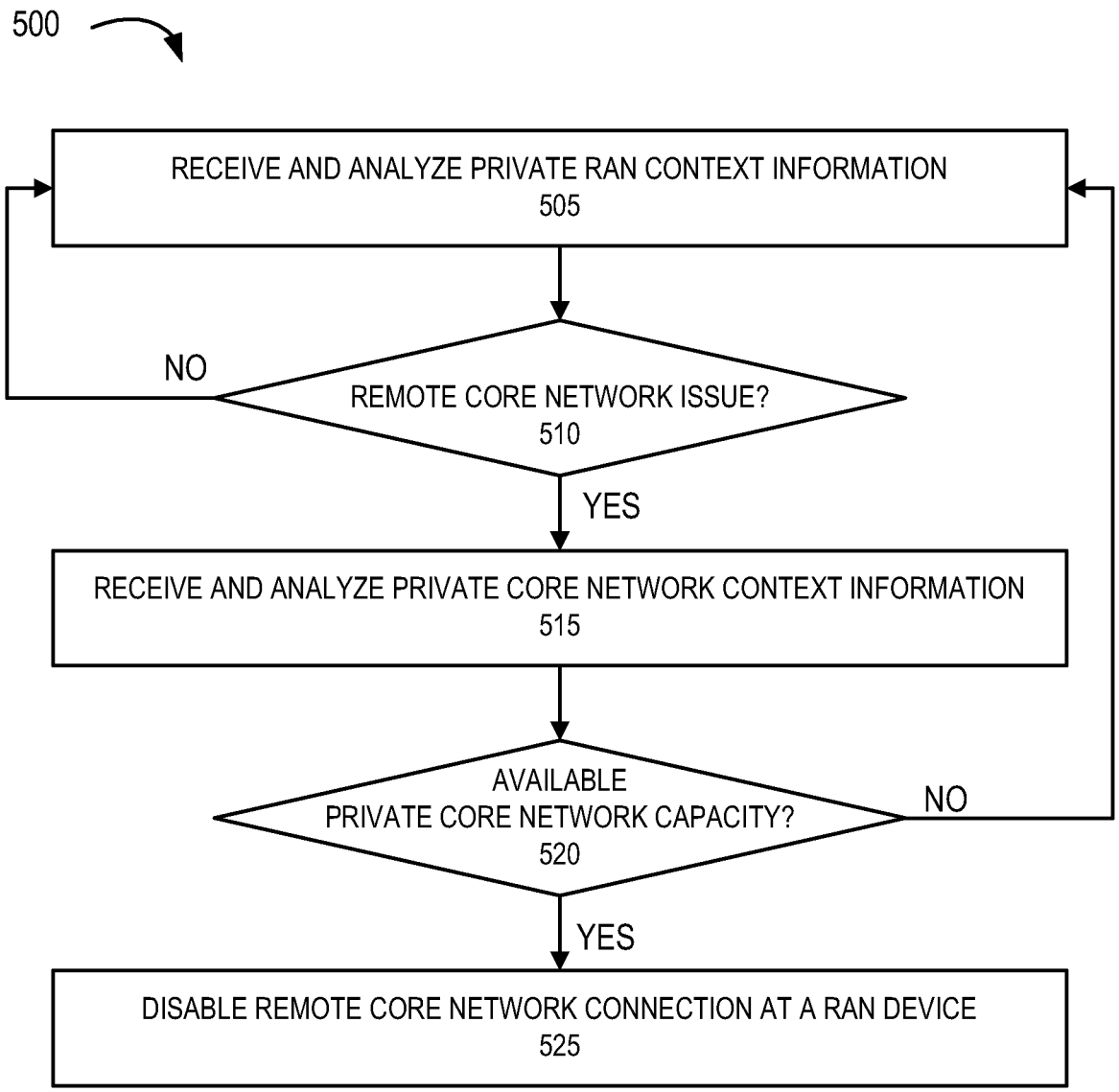
FIG. 5 is a flow diagram illustrating an exemplary process of an exemplary embodiment of the private network traffic optimization service.

FIG. 5 is a flow diagram illustrating an exemplary process 500 of an exemplary embodiment of the private network traffic optimization service. According to an exemplary embodiment, traffic optimizer 204 may perform a step of process 500. According to an exemplary implementation, processor 410 executes software 420 to perform a step of process 500, as described herein. Alternatively, a step may be performed by execution of only hardware.

In block 505, traffic optimizer 204 may receive and analyze private RAN context information. In block 510, traffic optimizer 204 may determine whether a remote core network issue exists, as described herein. When traffic optimizer 204 determines that a remote core network issue does not exist (block 510—NO), process 500 may return to block 505. When traffic optimizer 204 determines that a remote core network issue does exist (block 510—YES), traffic optimizer 204 may receive and analyze private core network context information (block 515). In block 520, traffic optimizer 204 may determine whether there is available private core network capacity, as described herein. When traffic optimizer 204 determines that there is not available private core network capacity (block 520—NO), process 500 may return to block 505. When traffic optimizer 204 determines that there is available private core network capacity (block 520—YES), traffic optimizer 204 may disable remote core network connection at a RAN device of relevance (block 525). As described herein, end devices 122/users 202 that may not be authorized to use the private core network may otherwise have access and use of the private core network based on a roaming configuration and disablement of the remote core network connection. The enablement of the roaming for such end devices 122/users 202 may also provide access and use of roaming core network 150.

FIG. 5 illustrates an exemplary process 500 of the private network traffic optimization service, according to other exemplary embodiments, the private network traffic optimization service may perform additional operations, fewer operations, and/or different operations than those illustrated and described.

Figure 6:
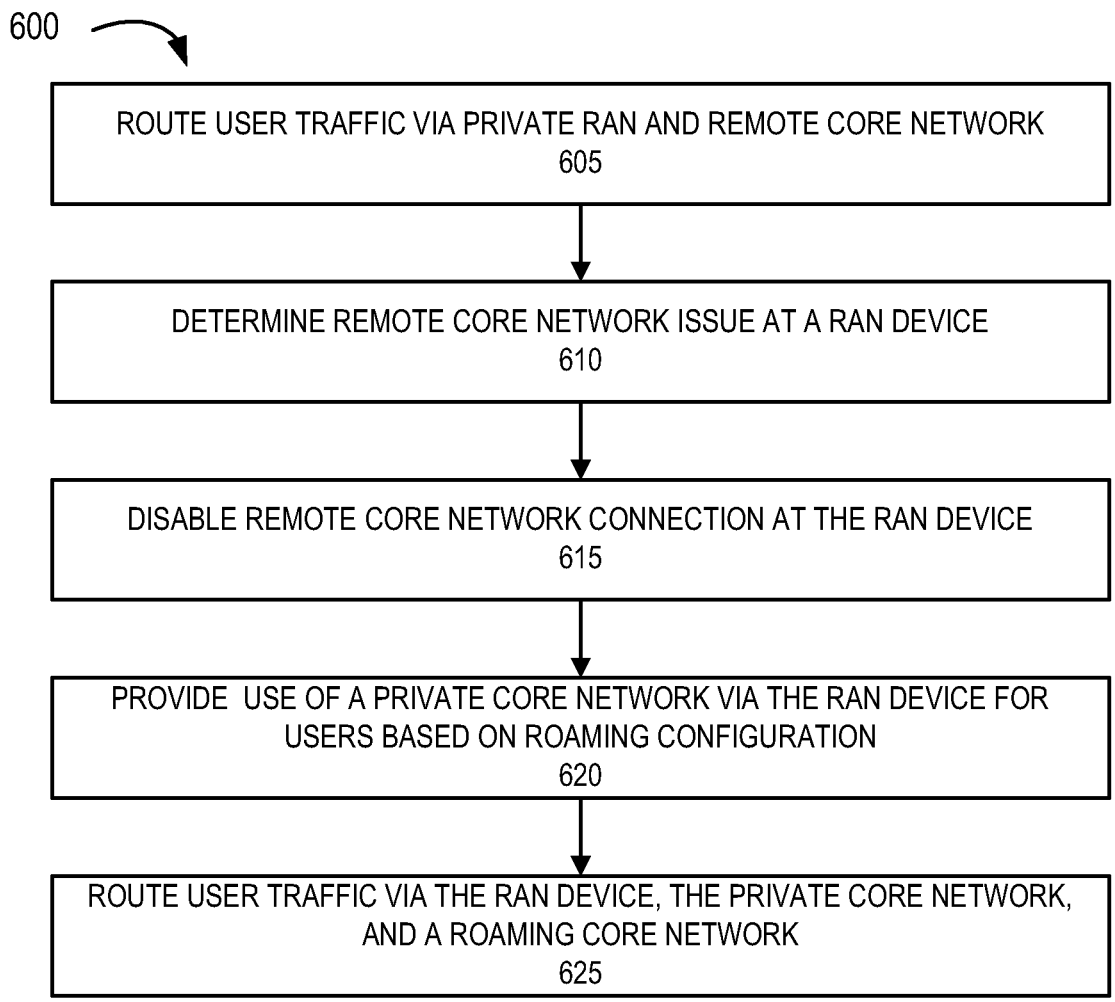
FIG. 6 is a flow diagram illustrating another exemplary process of an exemplary embodiment of the private network traffic optimization service.

FIG. 6 is a flow diagram illustrating an exemplary process 600 of an exemplary embodiment of the private network traffic optimization service. According to an exemplary embodiment, a private network (e.g., site 102) may perform a step of process 600. For example, access device 107, core device 112, and/or traffic optimizer 204 may perform a step of process 600, as described herein. According to an exemplary implementation, processor 410 executes software 420 to perform a step of process 550, as described herein. Alternatively, a step may be performed by execution of only hardware.

In block 605, site 102 may route user traffic via a private RAN and a remote core network, as described herein. The user traffic may pertain to users that do not have authorization to use the private core network, as described herein. In block 610, site 102 may determine an issue with a remote core network connection at a RAN device of the private RAN. For example, traffic optimizer 204 may make this determination based on context information, as described herein. In block 615, site 102 may disable the remote core network connection. For example, traffic optimizer 204 may disable the remote core network connection at the RAN device based on analysis of context information associated with the private core network and available network resources, as described herein. In block 620, site 102 may provide use of a private core network via the RAN device for users based on a roaming configuration. In block 625, site 102 may route user traffic via the RAN device, the private core network, and roaming core network 150, as described herein.

FIG. 6 illustrates an exemplary process 600 of the private network traffic optimization service, according to other exemplary embodiments, the private network traffic optimization service may perform additional operations, fewer operations, and/or different operations than those illustrated and described.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, a series of blocks have been described regarding the processes illustrated in FIGS. 5 and 6, however, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, diverse types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to the consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
analyzing, by a network device of a private network, first context information pertaining to at least one radio access network device of the private network, wherein the first context information includes information pertaining to an access and use of a remote core network on behalf of first users not authorized to use a core network of the private network;
determining, by the network device based on the analyzing, that the access and use of the remote core network is not available to the at least one radio access network device;
determining, by the network device, that the core network has available capacity;
disabling, by the network device at the at least one radio access network device, the access and use of the remote core network; and
enabling, by the network device at the at least one radio access network device, an access and use of the core network according to a roaming configuration of the private network.

2. The method of claim 1, further comprising:
analyzing, by the network device, second context information pertaining to the core network, wherein the second context information of the core network includes information pertaining to available network resources associated with the core network.

3. The method of claim 1, wherein the roaming configuration includes routing of traffic of the first users to and from the core network and a roaming core network.

4. The method of claim 1, wherein the determining that the core network has available capacity further comprises:
determining, by the network device, that the core network has available capacity to accommodate the first users and second users, wherein the second users are authorized access and use of the core network of the private network.

5. The method of claim 1, wherein the disabling comprises:
generating and transmitting, by the network device to the at least one radio access network device, a message that indicates disabling the access and use of the remote core network.

6. The method of claim 1, further comprising:
analyzing, by the network device after the enabling, third context information pertaining to the at least one radio access network device;
determining, by the network device based on the analyzing of the third context information, that the access and use of the remote core network is available; and
enabling, by the network device at the at least one radio access network device, the access and use of the remote core network.

7. The method of claim 1, wherein the first context information indicates at least one of a number of the first users or a number of sessions rejected associated with the first users.

8. The method of claim 1, wherein the first context information indicates at least one of a state of connectivity to the remote core network or a state of a remote core network device of the remote core network.

9. A network device comprising:
a processor that is configured to:
analyze first context information pertaining to at least one radio access network device of a private network to which the network device belongs, wherein the first context information includes information pertaining to an access and use of a remote core network on behalf of first users not authorized to use a core network of the private network;
determine, based on the analysis, that the access and use of the remote core network is not available to the at least one radio access network device;
determine that the core network has available capacity;
disable at the at least one radio access network device, the access and use of the remote core network; and
enable at the at least one radio access network device, an access and use of the core network according to a roaming configuration of the private network.

10. The network device of claim 9, wherein the processor is further configured to:
analyze second context information pertaining to the core network, wherein the second context information of the core network includes information pertaining to available network resources associated with the core network.

11. The network device of claim 9, wherein the roaming configuration includes routing of traffic of the first users to and from the core network and a roaming core network.

12. The network device of claim 9, wherein determining that the core network has capacity, the processor is further configured to:
determine that the core network has available capacity to accommodate the first users and second users, wherein the second users are authorized access and use of the core network of the private network.

13. The network device of claim 9, wherein, when disabling, the processor is further configured to:
generate and transmit to the at least one radio access network device, a message that indicates disabling the access and use of the remote core network.

14. The network device of claim 9, wherein the processor is further configured to:
analyze, after the enablement, third context information pertaining to the at least one radio access network device;
determine, based on the analysis of the third context information, that the access and use of the remote core network is available; and
enable at the at least one radio access network device, the access and use of the remote core network.

15. The network device of claim 9, wherein the first context information indicates at least one of a number of the first users or a number of sessions rejected associated with the first users.

16. The network device of claim 9, wherein the first context information indicates at least one of a state of connectivity to the remote core network or a state of a remote core network device of the remote core network.

17. A non-transitory computer-readable storage medium storing instructions executable by a processor of a network device of a private network, wherein the instructions are configured to:
analyze first context information pertaining to at least one radio access network device of the private network, wherein the first context information includes information pertaining to an access and use of a remote core network on behalf of first users not authorized to use a core network of the private network;
determine, based on the analysis, that the access and use of the remote core network is not available to the at least one radio access network device;
determine that the core network has available capacity;
disable at the at least one radio access network device, the access and use of the remote core network; and
enable at the at least one radio access network device, an access and use of the core network according to a roaming configuration of the private network.

18. The non-transitory computer-readable storage medium of claim 17, wherein the roaming configuration includes routing of traffic of the first users to and from the core network and a roaming core network.

19. The non-transitory computer-readable storage medium of claim 17, wherein the first context information indicates at least one of a number of the first users or a number of sessions rejected associated with the first users.

20. The non-transitory computer-readable storage medium of claim 17, wherein the first context information indicates at least one of a state of connectivity to the remote core network or a state of a remote core network device of the remote core network.

* * * * *